United States Patent [19]

Straker

[11] 4,345,487
[45] Aug. 24, 1982

[54] PROTECTIVE PAD FOR MOUNTING ON A BICYCLE PEDAL

[76] Inventor: Michael Straker, 771 SW. 15th St., Corvallis, Oreg. 97330

[21] Appl. No.: 122,450

[22] Filed: Feb. 19, 1980

[51] Int. Cl.³ .............................................. G05G 1/16
[52] U.S. Cl. ..................................... 74/563; 74/594.4
[58] Field of Search ................. 74/563, 594.4, 594.6, 74/560; 280/289 R, 289 G; 24/73 P, 73 PR, 73 PM, 93, 107

[56] References Cited

U.S. PATENT DOCUMENTS

| Re. 11,698 | 10/1898 | Nelson | 74/594.6 |
|---|---|---|---|
| 579,479 | 3/1897 | Goebler | 74/594.4 |
| 1,474,320 | 11/1923 | Mattia | 74/563 |
| 1,824,289 | 9/1931 | Milhander | 74/563 |
| 1,918,918 | 7/1933 | Lambert | 74/563 |
| 1,977,415 | 10/1934 | Thorp | 74/563 |
| 2,069,066 | 1/1937 | Harbour | 74/563 |
| 2,809,538 | 10/1957 | Caldwell | 74/563 |
| 3,067,536 | 12/1962 | Brittsan | 24/73 PF X |
| 3,859,867 | 1/1975 | Haines et al. | 74/563 |

FOREIGN PATENT DOCUMENTS

| 7611 | 7/1922 | Netherlands | 74/594.6 |

*Primary Examiner*—Kenneth Dorner
*Attorney, Agent, or Firm*—Kolisch, Hartwell & Dickinson

[57] ABSTRACT

A protective pad for mounting on a bicycle pedal provides comfort to a barefoot rider. The protective pad includes a pad member having a substantially flat surface for contact by the rider's foot and also includes a coupling extending from the pad member for detachable mounting of the pad member on at least one of the pedal's side members. The coupling includes a channel member formed of somewhat resilient material having opposed legs spaced-apart to define a slot. The slot receives the pedal side member with the opposed legs of the channel member frictionally engaging opposed surfaces of the side member.

3 Claims, 6 Drawing Figures

PROTECTIVE PAD FOR MOUNTING ON A BICYCLE PEDAL

BACKGROUND AND SUMMARY OF THE INVENTION

The present invention relates to accessories for bicycles, and more particularly to a novel pad for mounting on a bicycle pedal for protecting a rider's foot.

Modern day bicycles, particularly those of light frame racing construction, are provided with pedals having a generally rectangular metal frame. Extending between opposed side members of the frame is a central shaft upon which the rectangular metal frame is rotatably journaled. One end of the shaft is connected to a crank, which in turn is connected to the main drive sprocket of the bicycle. Many bicycles are provided with pedals having rectangular metal frames which have serrated edge portions for facilitating frictional grip between the bottom of a rider's shoe and the pedal.

However, many bicycle riders prefer to discard their shoes and rest the bottom soles of their feet directly on the metallic rectangular frame of the pedal. This is often done in the summertime or in beach or coastal areas. Unfortunately, because modern bicycle pedals include the aforementioned serrated edges, great discomfort to a barefoot rider results. While there have been several proposed solutions for mounting some type of protective cover on a bicycle pedal, none of these proposals have proved to be particularly advantageous.

For instance, one exemplary suggestion for providing a protective member on a bicycle pedal is set forth in U.S. Pat. No. 3,859,867 issued to Haynes et al. This patent discloses a sleeve which is removably adapted to enclose a bicycle pedal for protecting the feet of a rider. However, it is apparent that such a sleeve requires material which will extend below the pedal in order that the sleeve will grip the pedal. Of course, it can be readily appreciated that the material extending beneath the pedal serves no function in protecting a rider's feet but is necessary in order to provide frictional gripping onto the pedal. Thus, wastage of materials results. Additionally, it is a somewhat time consuming task for a rider to force such a sleeve over a pedal and it can be appreciated that such a sleeve may not be readily removed.

Other proposals are present in the prior art for providing pads on pedals but these are directed primarily to pads for mounting on automobile pedals and are not adapted for mounting on bicycle pedals, especially bicycles having metallic rectangular frame constructions.

Accordingly, it is a general object of the present invention to provide a protective pad for mounting on a bicycle pedal wherein the pedal includes a metallic rectangular frame. More particularly, the present invention is directed to providing a pad member having a substantially flat surface for contact by a rider's foot including a coupling means extending from the pad member for detachable mounting on at least one of the side members of the rectangular frame. The coupling means includes a gripping means or element formed as a channel member for frictionally engaging opposed surfaces of the side member of the rectangular frame. Thus, the pad member may be readily "clipped" to the pedal but is nonetheless readily removable.

Another object of the present invention is to provide a protective pad in which the gripping element is detachably connected to the pad member, and in a preferred embodiment, connected to the bottom surface of the pad member. To this end, the pad member is provided with a recess and the channel member is provided with a projection which may be detachably inserted into the recess. Additional recesses may be provided so that the channel member may be selectively positioned in a selected recess to vary the relative location of the channel member with respect to the pad member. Such a construction is provided so that if it is necessary to provide more than one channel member, the channel members may be selectively positioned on the pad member to accommodate bicycle pedal frames of varying dimensions.

These and additional objects and advantages of the present invention will be more readily understood after a consideration of the drawings and the detailed description of the preferred embodiment.

DETAILED DESCRIPTION OF THE PREFERRED EMBODIMENT

As mentioned previously, it is an object of the present invention to provide a protective pad for mounting on a bicycle pedal, and in particular a bicycle pedal having a metallic frame construction. Such pedals, as they are provided on modern lightweight bicycles, include side members which are serrated for providing frictional gripping against the bottom of a rider's shoe and are known as "rat-trap" pedals. The protective pad of the present invention contemplates the provision of a pad member which will be mounted on the frame construction of a pedal to provide a comfortable surface for a barefoot rider.

Figure 1:
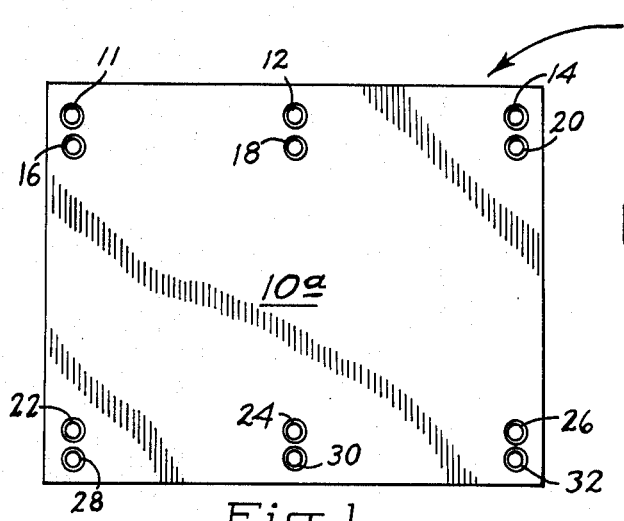
FIG. 1 is a bottom plan view of a pad member according to the present invention and illustrates location of a plurality of recesses provided in the bottom surface.
Figure 2:
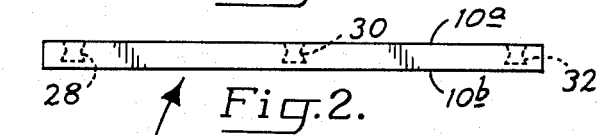
FIG. 2 is a side elevation view of pad member shown in FIG. 1 and illustrates in phantom lines the construction of the recesses.

As shown in FIG. 1, a pad member in accordance with the present invention is generally indicated at 10 and is preferably made from plastic material. A bottom surface of the pad member is indicated at 10a with the top surface being indicated at 10b (see FIG. 2). Pad member 10 is rectangularly dimensioned and includes a plurality of aligned recesses. More particularly, recesses 11, 12 and 14 are spaced-apart and are substantially aligned adjacent one side of the pad member. Positioned somewhat close to the aforementioned recesses are additional aligned recesses 16, 18 and 20. Disposed adjacent the opposite side of pad member 10, and directed inwardly through bottom surface 10a are recesses 22, 24 and 26. Additional aligned recesses 22, 24 and 26 are positioned inwardly and adjacent recesses 28, 30 and 32. As shown in FIG. 2, the recesses are formed as bores which extend from bottom surface 10a toward the upper or contact surface 10b of pad member 10. Additionally, it can be seen that each of the recesses is formed with a pair of truncated portions, the purpose of which will become apparent as this description proceeds.

Figure 3:
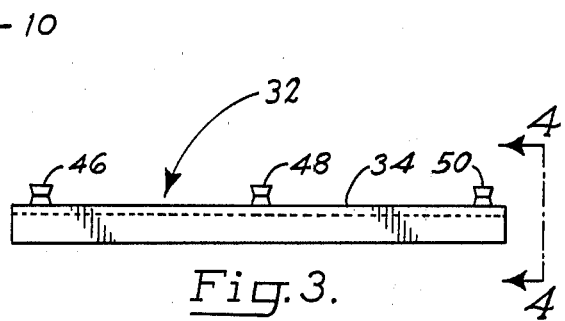
FIG. 3 is a side elevation view of a gripping element such as a channel member including projections for insertion into the recesses.
Figure 4:
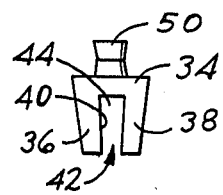
FIG. 4 is an enlarged end view, taken along lines 4—4 of FIG. 3, of the channel member shown in FIG. 3.

Turning to FIG. 3, there is indicated generally at 32 a coupling means which includes a gripping means or element formed as a channel member indicated at 34. Viewing FIG. 4, it can be seen that channel member 34 includes a pair of opposed spacedapart legs 36, 38 which are interconnected so as to define a slot 40. Channel member 34 is unitary and preferably formed of some type of relatively rigid plastic material which will provide some resiliency. As shown in FIG. 4, it is to be noted that the entry width to slot 40, designated at 42, is somewhat less than the top, inside distance spanning between the inside surfaces of legs 36, 38 indicated at 44.

Returning to FIG. 3, it can also be seen that channel member 34 is provided with projection means which, in the embodiment shown in FIG. 3, includes three projections such as indicated at 46, 48 and 50. Each of the projections is formed with a pair of truncated portions as illustrated, for insertion into corresponding aligned ones of the recess means so that a "snap fit" is provided. More particularly, it is to be noted that projections 46, 48 and 50 are spaced-apart a distance equal to the spacing between recess means 11, 12 and 14 as well as equal to the spacing between recesses 16, 18 and 20. Thus, it is possible for an individual to grip channel member 34 and urge the projections into correspondingly aligned recesses on pad member 10. For instance, projections 46, 48 and 50 may be suitably urged into recesses 11, 12 and 14 respectively to provide the aforementioned snap fit with the channel member substantially spanning across the bottom surface of the pad member. The channel member is therefore detachably connected to pad member 10 and because each of the projections is configured as illustrated, each will be frictionally held in the recesses when inserted thereinto. The channel member is detachable therefrom by manual force.

Figure 5:
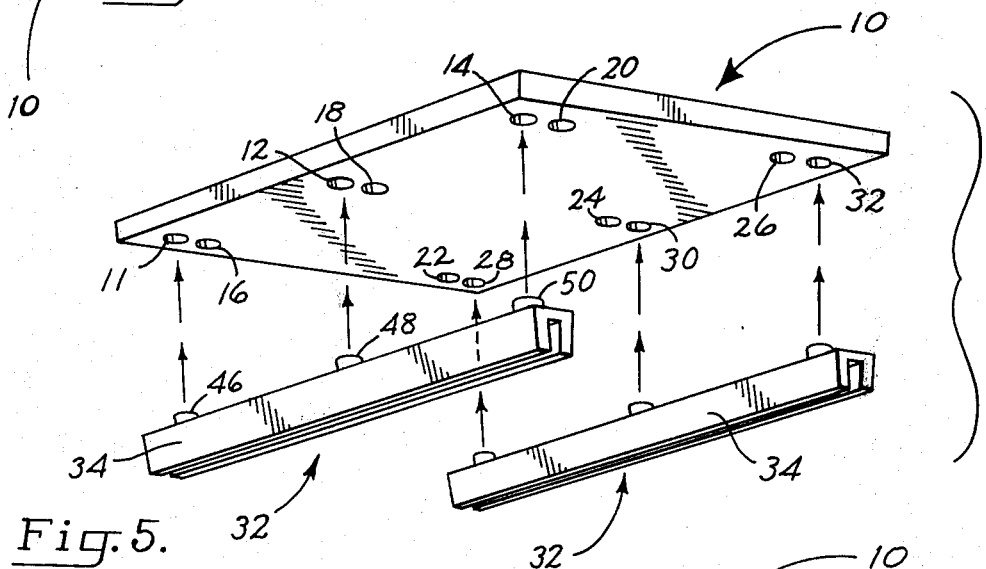
FIG. 5 is an exploded perspective view looking upwardly toward the bottom surface of the pad member illustrating the relative positioning of a pair of channel members prior to insertion into accommodating, aligned recesses provided in the bottom of the pad member.

Considering now assembly of a protective pad in accordance with the present invention, attention is directed to FIG. 5, As shown, pad member 10 is viewed in perspective looking toward bottom surface 10a. Initially, the dimension between opposed side members of a rectangular pedal frame is determined. For instance, with attention also directed to FIG. 6, it can be seen that a conventional pedal, generally indicated at 52, includes opposed side members 54, 56 which are interconnected by means of end members such as indicated at 58, 60. A central shaft is indicated at 62 and the rectangular frame of the pedal is suitably rotatably journaled thereto. A conventional crank, indicated at 64, is journaled to centrral shaft 62 and extends toward a main drive sprocket of a bicycle (not shown) for connection thereto.

Figure 6:
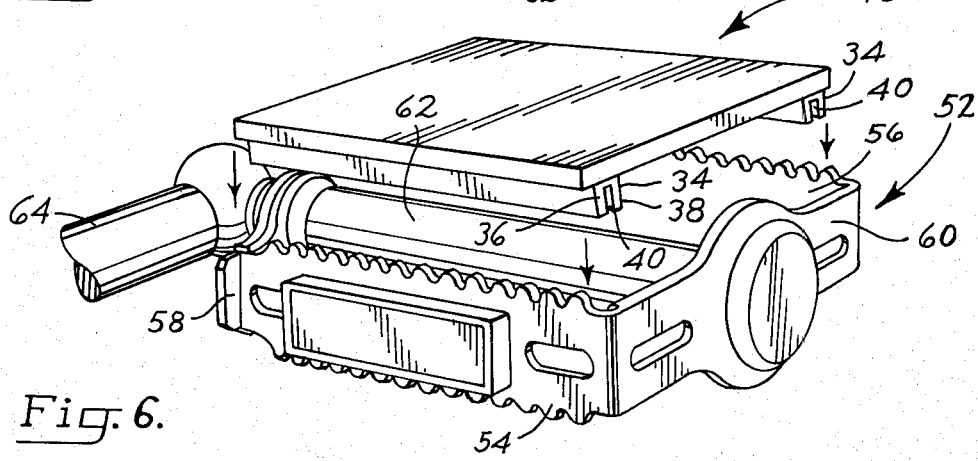
FIG. 6 is a perspective view of the protective pad of the present invention as it is moved downwardly for "clipping" to a bicycle pedal having a rectangular frame construction.

Returning to FIG. 5, it is to be noted that pad member 10 has been formed with recesses which will accommodate reception of a pair of channel members 34. As shown in FIG. 5, a pair of channel members 34 are shifted toward aligned recesses for insertion thereinto. Channel member 34 shown to the left in FIG. 5 is directed toward bottom surface 10a of the pad member so that projections 46, 48 and 50 will be inserted thereinto. Similarly, channel member 34 shown to the right in FIG. 5 is suitably directed toward recesses 28, 30 and 32 so that the projections provided on the channel member are inserted into the recesses and "snapped" thereinto for a snug fit by virtue of the truncated accommodating shapes of the recesses and the projections. Next, as shown in FIG. 6, pad member 10 is positioned above pedal 52 so that the channel members, with their associated slots, are positioned above side members of the pedal, such as side members 54, 56. The pad member is directed downwardly as shown by the arrows in FIG. 6 until the slots receive the side members with the opposed legs of the channel members frictionally engaging opposed surfaces of the side members.

More particularly, referring to channel member 34 shown in the left of FIG. 6, it can be seen that as its slot is aligned over side member 54, legs 36, 38 overlap the serrations on side member 54 as the thickness of the side member is received into slot 40. Thus, the channel member frictionally engages the opposed surfaces of side member 54 for gripping thereonto. Similarly, channel member 34 shown to the right in FIG. 6 is disposed over side member 56 of the pedal so that the legs of the channel member grip onto the opposed surfaces of side member 56 as the thickness of the side member is inserted into slot 40.

As mentioned previously with reference to FIG. 4, slot 40 is dimensioned with an entry width 42 which is somewhat less than the distance 44 at the top of the slot. Because channel member 34 is formed of nonrigid material, such as a suitable plastic, the thickness of side members 54, 56 creates a wedging action as the side members are inserted into the slots. Pad member 10 is thereby "clipped" onto pedal 52 as shown in FIG. 6.

An advantage of the present invention resides in the fact that additional recesses, such as those indicated at 16, 18 and 20 as well as 22, 24 and 26, are provided on pad member 10. By providing such additional recesses, pad member 10 may be suitably frictionally "clipped" to pedals having different lateral spacing between side members such as side members 54, 56 shown in FIG. 6. For instance, the distance between the channel members when they are inserted in recesses 10, 12 and 14 and 28, 30 and 32 will accommodate a pedal having a certain predetermined spacing between side members 54, 56. If a pedal having a smaller spacing between side members 54, 56 is to be provided with the protective pad of the present invention, one of the channel members may be suitably detached from the recesses and inserted in recesses located inwardly. Explaining further, channel member 34 shown to the left in FIG. 5 may be removed from insertion in recesses 11, 12 and 14 and inserted into recesses 16, 18 and 20. Similarly, if a pedal is provided with a still narrower spacing between side members 54, 56, channel 34 may be inserted into recesses 22, 24 and 26. Thus, it can be appreciated that the protective pad of the present invention, as illustrated, may be modified by suitable positioning of the channel members to accommodate pedals having as much as three different spacings between side members 54, 56. Of course, the provision of yet further recesses would accommodate still further various spacings between the side members of the pedal.

A particular advantage of the present invention resides in the construction in truncated form of the projections on the channel members which cooperate with the truncated recesses or bores in pad member 10. A so-called "snap fit" results and it is only necessary to use manual force to remove an inserted channel member. Of course, while a pair of channel members are shown in FIGS. 5 and 6, it may be necessary only to provide a single channel member if sufficient wedging action between the slot of a channel member and the thickness of a side member of the pedal is provided.

While the above invention has been described with reference to the foregoing preferred embodiment, it will be readily apparent to those skilled in the art that changes in form and detail may be made without departing from the spirit and scope of the invention as defined in the appended claims.

It is claimed and desired to secure by Letters Patent:

1. For use on a bicycle pedal having spaced-apart side members, a protective pad for mounting on the pedal comprising:
    a pad member having a substantially flat surface for contact by a rider's foot, said pad member being provided with recess means;
    coupling means including a gripping means detachably connected to and extending from said pad member, said gripping means being formed of resilient material and provided with projection means for detachable insertion into said recess means, said gripping means also including a slot dimensioned for receiving one of the side members for frictionally engaging opposed surfaces of the side member to thereby mount said pad member on the pedal; and
    said recess means and said projection means each being configured so that said projection means is frictionally held in said recess means when inserted thereinto and is detachable therefrom by manual force.

2. The protective pad of claim 1 wherein said recess means includes a truncated bore and said projection means includes a truncated projection dimensioned for snug insertion into said recess means.

3. The protective pad of claim 1 including additional recess means provided on the bottom surface of said pad member for receiving said projection means so that the position of said gripping means may be selectively varied.

* * * * *